UNITED STATES PATENT OFFICE 2,399,455

PROCESS FOR PREPARING STARCH ACETATE

Robert H. Treadway, Philadelphia, Pa., assignor to the United States of America as represented by the Secretary of Agriculture No Drawing. Application October 27, 1943, Serial No. 507,880

4 Claims. (Cl. 260—234)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a process for the direct acetylation of starch, and one of its objects is the production of a highly substituted starch acetate which may be used in the formulation of lacquers for coating and impregnating paper, cloth, and other fibrous materials, in the preparation of water-resistant adhesives and cements, and for coating and finishing wood and other hard surfaces.

A further object is to produce starch acetate which is not substantially degraded.

Other objects will appear from the following description:

Methods previously used to acetylate starch directly are characterized by slow esterification rates. If higher temperatures or greater catalyst concentrations are employed to expedite the reaction, a seriously degraded product is obtained. Acetic anhydride in particular esterifies starch quite slowly. Glacial acetic acid acetylates starch somewhat faster, but the reaction must be carried out at elevated temperatures for long periods in order to obtain high substitution. Under these conditions much acetolysis occurs, which results in a low viscosity product.

I have found that starch can be acetylated directly with a mixture of acetic anhydride and acetic acid if the weight relationship between the starch, acetic anhydride and acetic acid is maintained within certain limits. Thus, I have found that if acetic anhydride and acetic acid are used in proportions such that an approximately 1:1 ratio will result after taking into account the conversion of acetic anhydride to acetic acid by the moisture present in the starch to be acetylated, the acetylation can be readily effected. For example, if 55.5 parts of starch containing 9 percent moisture (50 parts of starch on a moisture-free basis) are to be acetylated in a 4:1 weight ratio of acetylating medium to starch, 131.2 parts of acetic acid anhydride and 63.3 parts of acetic acid should be used. These proportions give an effective initial composition of 50 parts of starch, 100 parts of acetic anhydride, and 100 parts of acetic acid, after combination of the moisture in the starch with its equivalent of acetic anhydride to produce acetic acid.

When the weight relationships are adjusted on this basis, equally good results can be obtained with starch ranging from a moisture-free state up to a moisture content of approximately 20 percent which includes starch in the "air-dry" moisture content range. This is shown by the experimental results set forth in the table below. In each experiment the equivalent of 50 g. of dry starch was acetylated in an effective mixture of 100 g. of acetic anhydride and 100 g. of acetic acid for nine hours at 95° C. The degree of substitution was practically the same in each case.

| Starch | Moisture content | Acetic anhydride | Acetic acid | Acetyl |
|---|---|---|---|---|
| G. | Per cent | G. | G. | Percent |
| 50.0 | Dry [1] | 100.0 | 100.0 | 43.8 |
| 52.5 | 4.8 | 114.2 | 83.3 | 43.2 |
| 55.5 | 9.0 | 131.2 | 63.3 | 43.1 |
| 59.0 | 15.2 | 151.0 | 40.0 | 42.6 |
| 62.5 | 20.0 | 170.5 | 17.0 | 43.3 |

[1] Dried in an oven for 16 hours at 100° C.

A material deviation from the 1:1 effective anhydride-acid ratio, however, substantially reduces the effectiveness of the process. The table above shows that dry starch was acetylated to approximately 98 percent completion by a 1:1 mixture of acetic anhydride and acetic acid. When two parts of anhydride to one part of acid or one part of anhydride to two parts of acid were used under the same conditions, acetylation was considerably less complete in the same period of time. Also, use of either pure acetic anhydride or acetic acid in the same ratio of acetylation liquid to starch and under similar experimental conditions resulted in conversion of only a minor part of the starch to the highly acetylated form. It is not necessary to maintain the anhydride to acid ratio at exactly 1:1, but it should be kept within the limits of a 3:2 ratio either way. Examples IV and V below illustrate the use of alternate 3:2 ratios.

The ratio of acetylation medium to starch is in part a matter of convenience in selecting a composition which is of workable consistency. An initial liquid to solid ratio of 4:1 by weight is given in the illustrations and examples. Where facilities are available for agitating more viscous mixtures, less than a 4:1 liquid to solid ratio may be employed. In certain instances, on the other hand, it might be desirable to use even a greater than 4:1 liquid to solid ratio. Variations in this respect between 3:1 and 5:1 are quite feasible.

There are also definite conditions of catalyst concentration, reaction temperature and reaction time which should be observed to realize the best results. Approximately 0.1 part of perchloric acid or 0.3 part of sulfuric acid per 50 parts of starch catalyzes the esterification in a 4:1 acetylation medium to starch mixture so that substantially complete acetylation is obtained in several hours. The optimum reaction temperature is about 95° C., which provides a relatively high esterification rate without causing excessive degradation. Variations between 90° to 100° C., however, will not materially affect the results obtained. The time required for reaching high substitution depends to a certain extent on the variety of starch acetylated. Thus, potato, tapioca, wheat, sweet potato, and rice starches are esterified to an acetyl content nearly equivalent to that of the triacetate after treatment for about nine hours under the conditions of catalyst concentration and temperature given above. Cornstarch, however, acetylates somewhat faster than the other common varieties of starch, and may be converted to triacetate in less than nine hours under optimum conditions of temperature and catalyst concentration.

My invention is illustrated by the following examples:

Example I 50 g. of dry potato starch (which had been heated in an oven at 100° C. to constant weight) was suspended in 100 g. of acetic anhydride. 100 g. of glacial acetic acid containing 0.175 g. of 60 percent perchloric acid was then mixed with the acetic anhydride-starch suspension. A small amount of heat was evolved at the time of complete formulation. The mixture was stirred at 95° C. for nine hours, by which time it had become a translucent, viscous, amber-colored liquid. The mass was then poured into ice water and disintegrated to white flaky particles which readily precipitated. The starch acetate thus obtained was washed thoroughly in cold water and then dried. It analyzed 43.8 percent acetyl and had a viscosity of 62.4 centistokes in 10 percent pyridine solution at 25° C., as measured by a Fenske-modified Ostwald pipet.

Example II

The composition of Example I was reproduced in an identical manner, except that 0.29 g. of sulfuric acid was used as catalyst instead of the perchloric acid. The same conditions of temperature and time were maintained during the esterification, and the product was recovered by the same method. The preparation analyzed 43.6 percent acetyl and gave a viscosity reading of 69.3 centistokes with a 10 percent pyridine solution at 25° C., using a Fenske-modified Ostwald pipet.

Example III 55.5 g. of cornstarch containing 9 percent moisture was mixed with 131.2 g. of acetic anhydride and 63.3 g. glacial acetic acid. This gave a composition having a ratio of acetylation medium to starch, on a moisture-free basis, of 4:1 and a mixture of equal parts of acetic anhydride and acetic acid, after conversion of the moisture present in the starch to acetic acid by reaction with its equivalent of acetic anhydride. 0.29 g. of concentrated sulfuric acid was added as catalyst, and the mixture was esterified for nine hours with continuous stirring at 95° C. The sample was then recovered by precipitation in cold water followed by washing and drying. The preparation analyzed 46.1 percent acetyl and gave a viscosity reading of 6.3 centistokes with a 10 percent pyridine solution at 25° C., using a Fenske-modified Ostwald pipet.

Example IV 50 g. of dry potato starch was mixed with 120 g. of acetic anhydride and 80 g. of glacial acetic acid. This gave a composition of 4 parts by weight of acetylation medium to 1 part of starch, with acetic anhydride and acetic acid bearing a 3:2 ratio to each other. As catalyst, about 0.18 g. of 60 percent perchloric acid was added. The mixture was acetylated for 11 hours at 95° C. with stirring. The product was recovered in the usual way. This preparation analyzed 44.0 percent acetyl and gave a viscosity reading of 24.8 centistokes with a 10 percent pyridine solution at 25° C., as measured by a Fenske-modified Ostwald pipet.

Example V 50 g. of dry potato starch was mixed with 80 g. of acetic anhydride and 120 g. of glacial acetic acid. This gave a composition of 4 parts by weight of acetylation medium to 1 part of starch, with acetic anhydride and acetic acid bearing a 2:3 ratio to each other. As catalyst, about 0.17 g. of 60 percent perchloric acid was added. The mixture was acetylated for nine hours at 95° C. with stirring. The product was recovered as in the preceding examples. This preparation analyzed 41.8 percent acetyl and gave a viscosity reading of 37.7 centistokes with a 10 percent pyridine solution at 25° C., using a Fenske-modified Ostwald pipet.

Example VI

The composition of Example I was reproduced in an identical manner except that sweet potato starch was used instead of potato starch. The preparation analyzed 41.3 percent acetyl and gave a viscosity reading of 16.2 centistokes with a 10 percent pyridine solution at 25° C., using a Fenske-modified Ostwald pipet.

Having thus described my invention, I claim:

1. The process of preparing starch acetate which comprises acetylating starch containing not more than about 20 percent moisture by weight, with a mixture of acetic anhydride and acetic acid, in the presence of an esterification catalyst selected from the group consisting of about 0.1 part perchloric acid and about 0.3 part sulfuric acid to 50 parts of starch at a temperature of the order of 90° to 100° C. for about 9 hours, the components of said mixture being initially present in proportions calculated to yield an effective ratio of acetic anhydride to acetic acid of at least 2:3 but not more than 3:2 after allowance for conversion of acetic anhydride to acetic acid by moisture in the starch, and said mixture being used in the proportion by weight on an effective basis of at least 3 parts but not more than 5 parts to each part of starch, the weight of starch being calculated on a moisture-free basis.

2. The process of preparing starch acetate which comprises acetylating starch containing not more than about 20 percent moisture by weight, with a mixture of acetic anhydride and acetic acid, in the presence of an esterification catalyst selected from the group consisting of about 0.1 part perchloric acid and about 0.3 part sulfuric acid to 50 parts of starch at a temperature of about 95° C. for about 9 hours, the components of said mixture being initially present in proportions calculated to yield an effective ratio of acetic anhydride to acetic acid of approximately 1:1 after allowance for conversion of acetic anhydride to acetic acid by moisture in the starch, and said mixture being used in the proportion by weight on an effective basis of approximately 4 parts to each part of starch, the weight of starch being calculated on a moisture-free basis.

3. The process of preparing starch acetate which comprises acetylating starch containing not more than about 20 percent moisture by weight, with a mixture of acetic anhydride and acetic acid, in the presence of about 0.1 part perchloric acid to 50 parts of starch at a temperature of the order of 90° to 100° C. for about 9 hours, the components of said mixture being initially present in proportions calculated to yield an effective ratio of acetic anhydride to acetic acid of at least 2:3 but not more than 3:2 after allowance for conversion of acetic anhydride to acetic acid by moisture in the starch, and said mixture being used in the proportion by weight on an effective basis of at least 3 parts but not more than 5 parts to each part of starch, the weight of starch being calculated on a moisture-free basis.

4. The process of preparing starch acetate which comprises acetylating starch containing not more than about 20 percent moisture by weight, with a mixture of acetic anhydride and acetic acid, in the presence of about 0.3 part sulfuric acid to 50 parts of starch at a temperature of the order of 90° to 100° C. for about 9 hours, the components of said mixture being initially present in proportions calculated to yield an effective ratio of acetic anhydride to acetic acid of at least 2:3 but not more than 3:2 after allowance for conversion of acetic anhydride to acetic acid by moisture in the starch, and said mixture being used in the proportion by weight on an effective basis of at least 3 parts but not more than 5 parts to each part of starch, the weight of starch being calculated on a moisture-free basis.

ROBERT H. TREADWAY.